(12) United States Patent
Kataoka (10) Patent No.: US 9,407,897 B2
(45) Date of Patent: Aug. 2, 2016

(54) VIDEO PROCESSING APPARATUS AND VIDEO PROCESSING METHOD

(75) Inventor: Mitsuteru Kataoka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 226 days.

(21) Appl. No.: 14/347,331

(22) PCT Filed: Sep. 30, 2011

(86) PCT No.: PCT/JP2011/005536
§ 371 (c)(1),
(2), (4) Date: Mar. 26, 2014

(87) PCT Pub. No.: WO2013/046281
PCT Pub. Date: Apr. 4, 2013

(65) Prior Publication Data
US 2014/0225987 A1    Aug. 14, 2014

(51) Int. Cl.
*H04N 13/02* (2006.01)
*H04N 13/00* (2006.01)

(52) U.S. Cl.
CPC ......... *H04N 13/0025* (2013.01); *H04N 13/004* (2013.01); *H04N 13/007* (2013.01); *H04N 13/0022* (2013.01); *H04N 13/0066* (2013.01)

(58) Field of Classification Search
None
See application file for complete search history.

(56) References Cited

U.S. PATENT DOCUMENTS

| 7,720,308 | B2 | 5/2010 | Kitaura et al. |
| 8,150,238 | B2 | 4/2012 | Sasaki et al. |
| 8,436,941 | B2 | 5/2013 | Kondo et al. |
| 8,467,664 | B2 | 6/2013 | Sasaki et al. |
| 2003/0095135 | A1* | 5/2003 | Kaasila ................. G06F 3/0481 345/613 |
| 2006/0126919 | A1 | 6/2006 | Kitaura et al. |
| 2009/0142041 | A1 | 6/2009 | Nagasawa et al. |
| 2009/0303383 | A1 | 12/2009 | Hamada et al. |

(Continued)

FOREIGN PATENT DOCUMENTS

| JP | 11-289555 A | 10/1999 |
| JP | 2004-165708 A | 6/2004 |

(Continued)

OTHER PUBLICATIONS

International Search Report issued in PCT/JP2011/005536, dated Dec. 20, 2011, with English abstract.

*Primary Examiner* — Huy T Nguyen
*Assistant Examiner* — Eileen Adams
(74) *Attorney, Agent, or Firm* — McDermott Will & Emery LLP (57) ABSTRACT

A video processing apparatus includes: an obtainment unit which obtains a stereoscopic video, a subtitle data item, and subtitle depth information indicating a position of the subtitle data item in a depth direction; a depth level input unit which receives an input of depth level information for adjusting a depth effect of the stereoscopic video; a depth adjustment unit which adjusts, according to the depth level information, the depth effect of the stereoscopic video and a depth effect of the subtitle depth information in association with each other; a subtitle video generation unit which generates a subtitle video from the subtitle depth information adjusted by the depth adjustment unit and the subtitle data item; a video combining unit which combines the stereoscopic video and the subtitle video to generate a combined video; and an output unit which outputs the combined video generated by the video combining unit.

4 Claims, 9 Drawing Sheets

(56) References Cited

U.S. PATENT DOCUMENTS

| | | |
|---|---|---|
| 2009/0310021 A1 | 12/2009 | Kondo et al. |
| 2010/0328432 A1 | 12/2010 | Tanaka |
| 2011/0007131 A1 | 1/2011 | Okada et al. |
| 2011/0018966 A1 | 1/2011 | Kitazato |
| 2011/0134210 A1 | 6/2011 | Tsukagoshi |
| 2011/0134213 A1 | 6/2011 | Tsukagoshi |
| 2011/0141232 A1 | 6/2011 | Tsukagoshi |
| 2011/0141233 A1 | 6/2011 | Tsukagoshi |
| 2011/0141234 A1 | 6/2011 | Tsukagoshi |
| 2011/0141235 A1 | 6/2011 | Tsukagoshi |
| 2011/0141238 A1 | 6/2011 | Tsukagoshi |
| 2011/0142426 A1 | 6/2011 | Sasaki et al. |
| 2011/0149024 A1 | 6/2011 | Tsukagoshi |
| 2011/0149034 A1 | 6/2011 | Tsukagoshi |
| 2011/0149035 A1 | 6/2011 | Tsukagoshi |
| 2011/0157163 A1 | 6/2011 | Suzuki |
| 2011/0310099 A1 | 12/2011 | Yamana et al. |
| 2012/0026290 A1* | 2/2012 | Lim .................. H04N 13/0239 348/46 |
| 2012/0147141 A1 | 6/2012 | Sasaki et al. |
| 2012/0249735 A1 | 10/2012 | Tsukagoshi |
| 2012/0257014 A1 | 10/2012 | Tsukagoshi |
| 2012/0315022 A1 | 12/2012 | Nagasawa et al. |
| 2013/0010062 A1* | 1/2013 | Redmann ............... H04N 5/278 348/43 |

FOREIGN PATENT DOCUMENTS

| | | |
|---|---|---|
| JP | 2006-325165 A | 11/2006 |
| JP | 2009-135686 A | 6/2009 |
| JP | 2009-301605 A | 12/2009 |
| JP | 2010-021991 A | 1/2010 |
| JP | 2011-010128 A | 1/2011 |
| JP | 2011-019191 A | 1/2011 |
| JP | 2011-029849 A | 2/2011 |
| JP | 2011-030200 A | 2/2011 |
| JP | 2011-070450 A | 4/2011 |
| JP | 4676579 B2 | 4/2011 |
| JP | 2011-139331 A | 7/2011 |

* cited by examiner

| Depth level information | Depth of subtitle | Font size correction |
|---|---|---|
| Great | Obtained subtitle depth information | – |
| Small | 1/2 of obtained subtitle depth information | Small |
| OFF (2D image) | – | Great |

VIDEO PROCESSING APPARATUS AND VIDEO PROCESSING METHOD

RELATED APPLICATIONS

This application is the U.S. National Phase under 35 U.S.C. § 371 of International Application No. PCT/JP2011/005536, filed on Sep. 30, 2011, the disclosure of which Application is incorporated by reference herein.

TECHNICAL FIELD

The present invention relates to a video processing apparatus and a video processing method for stereoscopically displaying subtitles to be superimposed on a video.

BACKGROUND ART

A conventional stereoscopic subtitle display method disclosed in Patent Literature (PTL) 1 allows stereoscopically displaying subtitles included in a video and adjusting a shape or display coordinates of the subtitles to popup a "balloon" from the mouth of a speaker.

Here, a conventional stereoscopic subtitle display method is described in detail with reference to FIG. 8 and FIG. 9.

Figure 8:
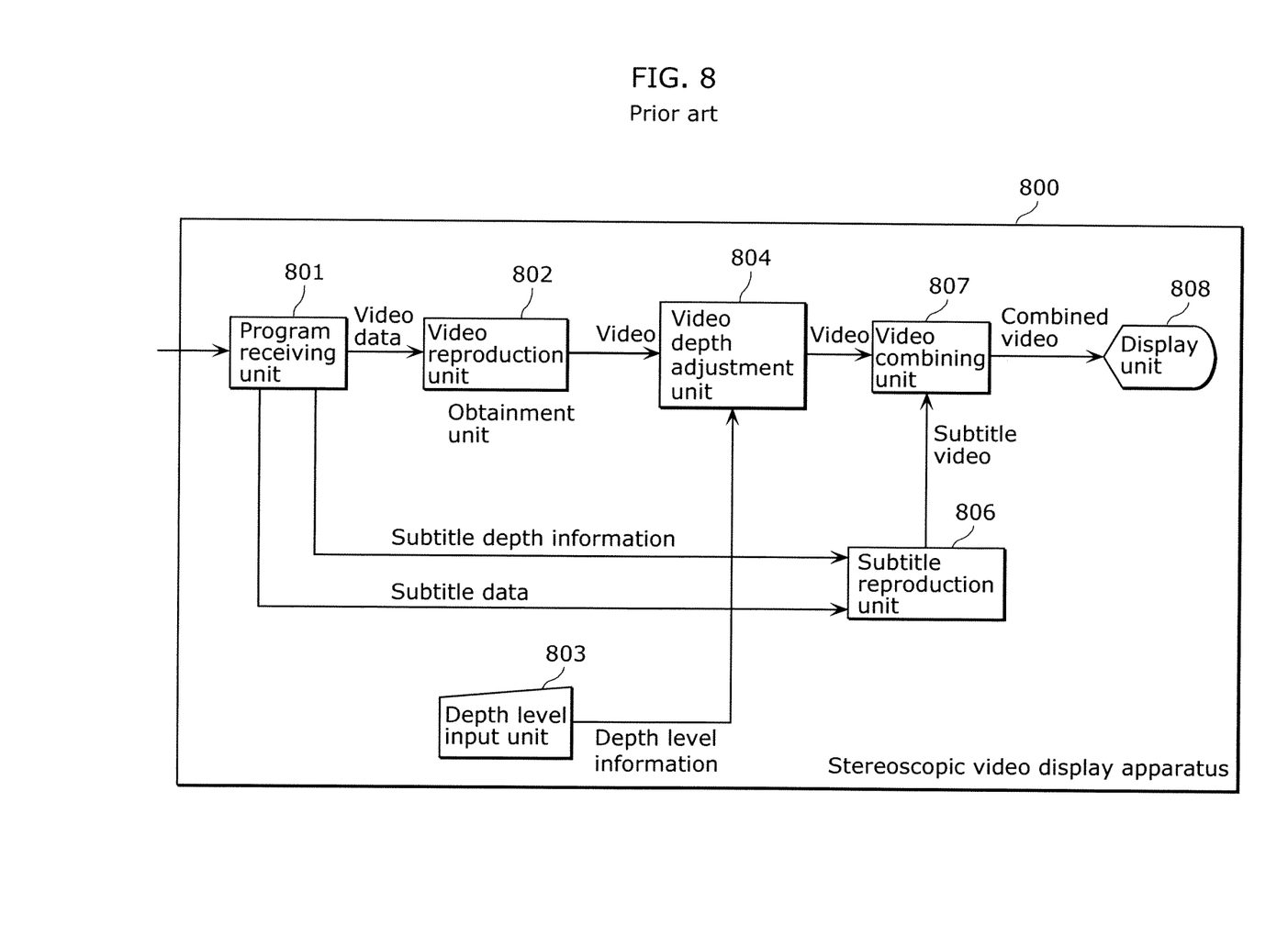
FIG. 8 is a diagram illustrating a structure of a conventional stereoscopic subtitle display apparatus.

FIG. 8 is a diagram illustrating a structure of a conventional stereoscopic subtitle display apparatus 800. The stereoscopic subtitle display apparatus 800 in FIG. 8 includes a program receiving unit 801, a video reproduction unit 802, a depth level input unit 803, a video depth adjustment unit 804, a subtitle reproduction unit 806, a video combining unit 807, and a display unit 808.

Figure 9:
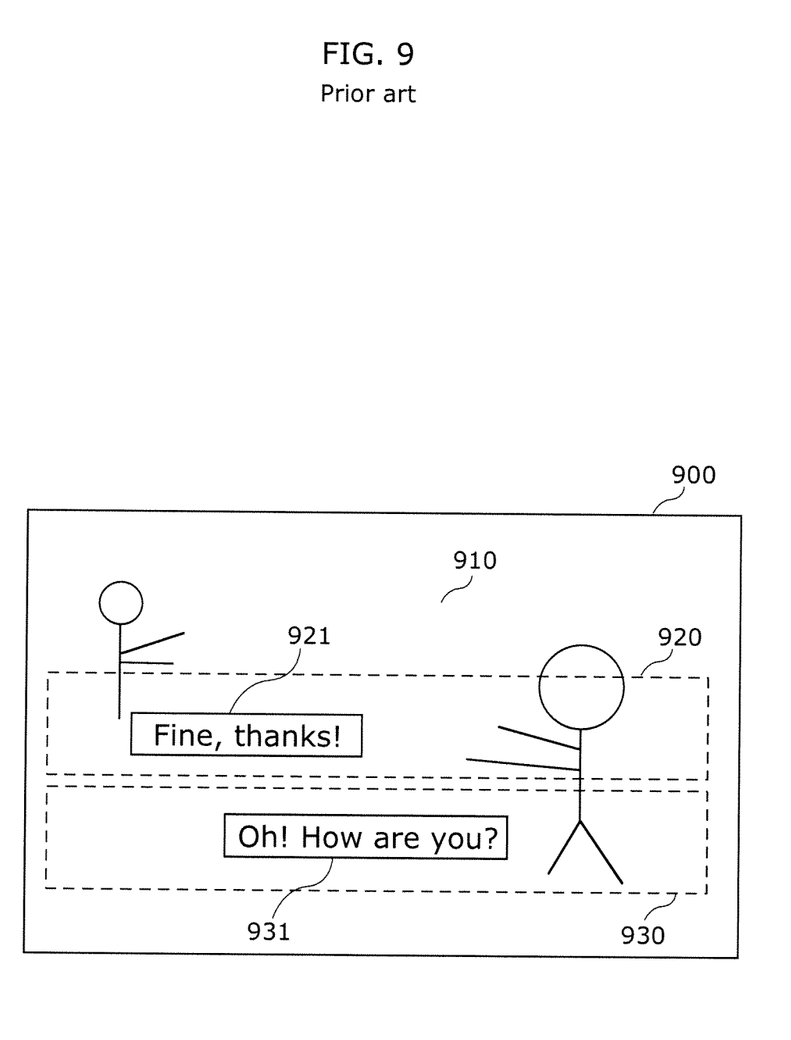
FIG. 9 illustrates an example of stereoscopic subtitle display by a conventional stereoscopic subtitle display apparatus.

FIG. 9 illustrates an example of a stereoscopic subtitle displayed by the conventional stereoscopic subtitle display apparatus 800. A display image 900 in FIG. 9 is an image displayed on the display unit 808 at a certain moment. This display image 900 is obtained by superimposing a first subtitle display area 920 and a second subtitle display area 930 on a video 910.

The video 910 is a stereoscopic video obtained by converting the video reproduced by the video reproduction unit 802 by the video depth adjustment unit 804. In the first subtitle display area 920, a subtitle instance 921 is displayed. The subtitle instance 921 according to an example in FIG. 9 is "Fine, thanks!" In the second subtitle display area 930, a subtitle instance 931 is displayed. The subtitle instance 931 according to an example in FIG. 9 is "Oh! How are you?"

The depths (Z coordinate which is a position in a perpendicular direction with respect to the display plane of the display unit 808) of the subtitle instances 921 and 931 are determined for the first subtitle display area 920 and the second subtitle display area 930, respectively. Furthermore, the lengths and the designated coordinate positions of the character strings displayed in the first subtitle display area 920 and the second subtitle display area 930 (partial area represented by the X-Y coordinates on the display plane of the display unit 808) are determined for the subtitle instances 921 and 931, respectively.

CITATION LIST

Patent Literature

[PTL 1] Japanese Unexamined Patent Application Publication No. 11-289555

SUMMARY OF INVENTION

Technical Problem

However, the conventional stereoscopic subtitle reproduction method and apparatus have the following problem.

The Z coordinates of the subtitle instances 921 and 931 are determined based on subtitle depth information included in subtitle data including subtitle character strings. This subtitle depth information is defined arbitrarily by a content producer, and is defined independently from the depth information (parallax) of the video 910.

On the other hand, the depth level of the video 910 is adjusted by the video depth adjustment unit 804 following the user's inputting the depth level information via the depth level input unit 803. However, in the case where the depth of the video 910 is changed, the subtitle instances 921 and 931 are located farther than the video 910, which may cause the display image 900 to be unnatural with the subtitle instances 921 and 931 "buried" in the video 910 or located too far away from the speaker in the depth direction. Specifically, changing the depth of the video 910 may cause a problem that the display image 900 different from the intention of the content producer is displayed on the display unit 808.

The present invention has been conceived in view of the above problem, and has an object to provide a video processing apparatus and a video processing method capable of displaying a video in which the intention of the content producer is reflected when displaying a video with added subtitles and even when the depth of the video has been changed.

Solution to Problem

A video processing apparatus according to an aspect of the present invention includes: an obtainment unit configured to obtain a stereoscopic video, a subtitle data item, and subtitle depth information indicating a position of the subtitle data item in a depth direction; a depth level input unit configured to receive an input of depth level information for adjusting a depth effect of the stereoscopic video; a depth adjustment unit configured to adjust, according to the depth level information, the depth effect of the stereoscopic video and a depth effect of the subtitle data item indicated by the subtitle depth information in association with each other; a subtitle video generation unit configured to generate a subtitle video from the subtitle depth information adjusted by the depth adjustment unit and the subtitle data item; a video combining unit configured to combine the stereoscopic video and the subtitle video to generate a combined video; and an output unit configured to output the combined video generated by the video combining unit.

The video processing apparatus having the above structure adjusts the depth effect of the stereoscopic video and the depth effect of the subtitle data item indicated by the subtitle depth information in association with each other. With this, even when the depth effect is suppressed to reduce the burden on the user, it is possible to prevent the subtitles from being buried into or projected from the video in the depth direction for example. Specifically, the video reflecting the intention of the content producer can be shown to the user.

Furthermore, when the depth level information indicates that the depth effect is to be weakened, the depth adjustment unit may be configured to increase a font size of the subtitle data item to be positioned frontward, and decrease a font size of the subtitle data item to be positioned backward.

Representing the lost depth effect by the font size in this manner allows showing the video further reflecting the intention of the content producer to the user. It is to be noted that "the depth effect is to be weakened" indicates a processing for approximating the stereoscopic video to a flat (two-dimensional) image. Specifically, the subtitle which is originally to be displayed forward from a surface (display screen) of the display device is moved backward toward the display screen. In contrast, the subtitle which is originally to be displayed backward from the display screen is moved forward toward the display screen.

Furthermore, when the depth level information indicates that the depth effect is to be lost, the depth adjustment unit may be configured to overlay-display, out of a plurality of the subtitle data items displayed simultaneously, a subtitle data item to be positioned frontward on a subtitle data item to be positioned backward.

The subtitle depth information is transmitted with an assumption that the display apparatus is capable of displaying the stereoscopic image. However, in the case of a two-dimensional display device not capable of displaying the stereoscopic image, the image cannot be displayed with reflecting the intention of the content producer even when the subtitle depth information is transmitted. In other words, the user cannot understand which subtitle instance is near and which is far at all. Overlaying the subtitles to present the depth effect as described above allows showing the video reflecting the intention of the content producer to the user. It is to be noted that "the depth effect is to be lost" indicates a processing for converting the stereoscopic image into a perfect two-dimensional video.

Furthermore, the video processing apparatus may further include a biological safety determination unit configured to calculate a biological safety determination value indicating how much a viewer is influenced by viewing the combined video. The depth adjustment unit may be configured to weaken the depth effect of the subtitle data item indicated by the subtitle depth information when the biological safety determination value is greater than a first threshold.

Furthermore, the depth adjustment unit may be configured to weaken the depth effect of the stereoscopic video when the biological safety determination value is greater than a second threshold that is greater than the first threshold.

In general, viewing a stereoscopic image for a long time makes the user's eyes tired and makes the user feel like seasick. It is also said to have an adverse influence on a user at an early age in the process of growth of spatial reasoning capacity through stereoscopic viewing which increases with age. In particular, the subtitle is a sort of content that the user needs to watch carefully to read, and thus the user cannot take his/her eyes off even for a moment. Thus, it is desirable to reduce the depth effect of the subtitle in priority to the video based on the biological safety determination value, as described above.

Furthermore, the video processing apparatus may further include a biological safety setting unit configured to obtain a biological safety set value indicating a state of a user viewing the combined video outputted from the output unit. The biological safety determination unit may be configured to calculate the biological safety determination value based on the biological safety set value obtained by the biological safety setting unit.

Furthermore, the biological safety determination unit may be configured to obtain information indicating a genre of the stereoscopic video from the obtainment unit and calculate the biological safety determination value based on the obtained information indicating the genre.

A video processing method according to an aspect of the present invention includes: obtaining a stereoscopic video, a subtitle data item, and subtitle depth information indicating a position of the subtitle data item in a depth direction; receiving an input of depth level information for adjusting a depth effect of the stereoscopic video; adjusting, according to the depth level information, the depth effect of the stereoscopic video and a depth effect of the subtitle data item indicated by the subtitle depth information in association with each other; generating a subtitle video from the subtitle depth information adjusted in the adjusting and the subtitle data item; combining the stereoscopic video and the subtitle video to generate a combined video; and outputting the combined video generated in the combining.

Advantageous Effects of Invention

With the present invention, even when the user adjusts the depth effect, the depth effect of the video and that of the subtitle are adjusted in association with each other, which allows correctly presenting the content producer's intention to the user. In other words, it is possible to prevent the subtitles from being displayed too far back (buried) into the video and from being too far (projected) from the speaker, thereby realizing a natural display.

DESCRIPTION OF EMBODIMENTS

Embodiments according to the present invention are described below with reference to the Drawings.

(Embodiment 1)

Figure 1:
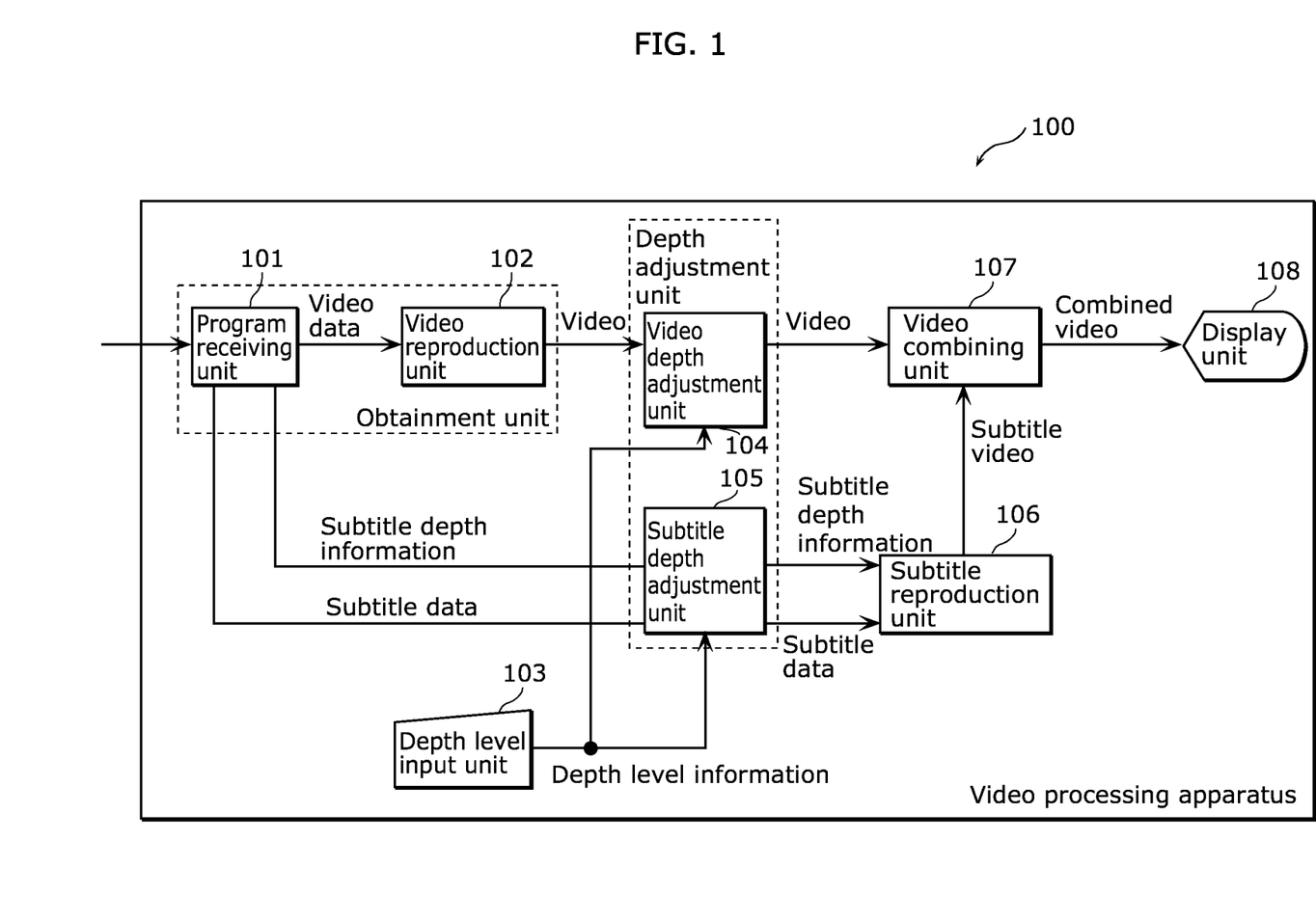
FIG. 1 is a diagram illustrating a structure of a video processing apparatus according to Embodiment 1.

FIG. 1 is a diagram showing a structure of a video processing apparatus 100 according to Embodiment 1 of the present invention. The video processing apparatus 100 includes a program receiving unit 101, a video reproduction unit 102, a depth level input unit 103, a video depth adjustment unit 104, a subtitle depth adjustment unit 105, a subtitle reproduction unit 106, a video combining unit 107, and a display unit 108.

The program receiving unit 101 receives video data, subtitle data items, and subtitle depth information from broadcast, communication, package media, or a combination of the above. The program receiving unit 101 outputs the video data to the video reproduction unit 102, and subtitle data items and the subtitle depth information to the subtitle depth adjustment unit 105.

The video data may be of Motion Picture Expert Group (MPEG-2) which is a video format used in digital broadcast, for example. It is to be noted that a typical example of the video data received by the program receiving unit 101 is stereoscopic video data.

Alternatively, it is also possible to obtain two-dimensional video data and create a pseudo stereoscopic video from the obtained two-dimensional video data. The stereoscopic image may be created by a technique using a motion vector, or by heuristics in which a blue area in the upper part of the screen is determined to be the sky and in distance, for example.

Furthermore, the subtitle data may be the subtitle data defined by the Association of Radio Industries and Businesses (ARIB) standards which are the broadcast standards of Japan, or the SUBTITLE data defined by ETSI EN300 743 which is the broadcast standards of Europe.

Furthermore, the subtitle depth information is information designating the depth effect to be applied when the subtitle data is stereoscopically displayed on the display unit 108, per specific area of the subtitle display and/or subtitle instance which is the specific image at a specific time. The subtitle depth information can be stored by extending the format of the subtitle data and by transmitting data other than the subtitle data by associating with the subtitle instance. Both of the above can be used.

The video reproduction unit 102 decodes and reproduces the video data obtained from the program receiving unit 101, and converts the video data into a video. For example, in the case of MPEG-2 video data, an MPEG-2 video decoder may be used as the video reproduction unit 102. It is to be noted that the program receiving unit 101 and the video reproduction unit 102 constitute an obtainment unit.

The depth level input unit 103 receives from the user an input of an instruction to adjust the depth effect of the video displayed by the video processing apparatus 100. The depth level input unit 103 then outputs the received instruction as the depth level information to the video depth adjustment unit 104 and the subtitle depth adjustment unit 105. How to receive the input of the instruction is not specifically limited, and includes: allowing the user to operate a physical mechanical part such as a button, volume control, and slide switch of a remote controller; allowing the user input via the graphic user interface (GUI) displayed on the display unit 108; and use of the voice recognition.

Alternatively, the depth effect may be weakened following recognition of the user's gesture indicating that the user feels eye fatigue, or automatic recognition of the user's eye fatigue based on the cumulative viewing time.

Every person has a different perception to stereoscopic images, and a drastic change in depth effect brings not only the reality but also eye fatigue which makes the user feel sick like in seasick. Furthermore, the currently-available stereoscopic video is believed to be harmful to infants whose the stereoscopic video perceptual capability is in the development stage. Furthermore, even the same user may feel some burden when his/her eyes are tired or the depth effect of the video is stronger in some sort of content.

In order to respond to such diverse situations, a function to adjust the level of depth effect of the stereoscopic image is required. The user who views a video with the video processing apparatus 100 according to Embodiment 1 is allowed to adjust the depth level of the video via the depth level input unit 103.

The video depth adjustment unit 104 adjusts the depth effect of the video obtained from the video reproduction unit 102 based on the depth level information obtained from the depth level input unit 103, and outputs the adjusted video to the video combining unit 107. In a three-dimensional (3D) TV and the like, a right-eye image and a left-eye image having a parallax is shown to the right eye and the left eye of the user, respectively and independently, thereby allowing the user to perceive the depth of the object for example. The user perceives that the object is farther as the right-eye video and the left-eye video of the single object is away from each other outward, and that the object is closer as the videos are closer. Furthermore, when the position of the right-eye video and the position of the left-eye video are exchanged and the distance therebetween increases, the user perceives that the object is projecting from the display screen.

Here, as an example of a way to adjust the depth effect, the video depth adjustment unit 104 makes the right-eye video and the left-eye video farther from or closer to each other in the horizontal direction. As another example, the video depth adjustment unit 104 acquires a two-dimensional video from arbitral viewpoints by acquiring a map of the desired viewpoint with a three-dimensional modeling temporarily provided on the semiconductor memory.

The subtitle depth adjustment unit 105 outputs the depth-adjusted subtitle depth information and the subtitle data to the subtitle reproduction unit 106, based on the subtitle depth information obtained by the program receiving unit 101, the subtitle data obtained from the program receiving unit 101, and the depth level information obtained from the depth level input unit 103.

It is to be noted that the video depth adjustment unit 104 and the subtitle depth adjustment unit 105 constitute the depth adjustment unit. The depth adjustment unit adjusts the depth effect of the video data and the depth effect of the subtitle data indicated by the subtitle depth information in association with each other, based on the depth level information. Furthermore, when the subtitle depth information is adjusted in a direction in which the depth effect is weakened, the subtitle depth adjustment unit 105 adjusts the subtitle data item to compensate the weakened depth effect. Details will be described later.

The subtitle reproduction unit 106 generates the subtitle video from the subtitle data item obtained from the subtitle depth adjustment unit 105 and the subtitle depth information. Specifically, the subtitle reproduction unit 106 performs processing to convert the subtitle data item which is text data into image data (bit map and the like), to give the image data a depth effect based on the subtitle depth information.

First, the subtitle reproduction unit 106 generates the subtitle video of two-dimensional image by reproducing the subtitle data item. Out of the subtitle video, an area displaying nothing is colored with a transparent color. Next, the subtitle reproduction unit 106 corrects a side position of the subtitle video on the right-eye image, based on the subtitle depth information. Specifically, the subtitle reproduction unit 106 moves a farther subtitle video outward (to the right), and a closer subtitle video inward (to the left). Regarding the left-eye image, in the same manner, the subtitle reproduction unit 106 moves a farther subtitle video outward (to the left, that is opposite from the case of the right-eye image), and a closer subtitle video inward (to the right, that is opposite from the case of the right-eye image).

The video combining unit 107 generates a combined video by combining the video obtained from the video depth adjustment unit 104 and the subtitle video obtained from the subtitle reproduction unit 106. The video combining unit 107 outputs the generated combined video to the display unit 108.

Assuming that the subtitle video is always in front of (forward of) the video of the speaker, it is sufficient to overlay the subtitle video on the video to combine. In other words, the videos can be combined by selecting, for each pixel, a video for the area colored with the transparent color out of the subtitle video, and a subtitle video for the area other than the above area. The video combining unit 107 may be a general graphic processor mounted on a graphic board of a personal computer (PC) or a video game machine for example.

The display unit 108 presents the combined image obtained from the video combining unit 107 as a video which the user can perceive. The display unit 108 is a display capable of displaying a stereoscopic video, and may be a display in combination of a plasma display panel and active shutter 3D glasses or a glasses-free 3D display in which the lenticular lens or a slit is attached on the liquid crystal display (LCD) for example. However, without being limited to these combinations, any structure capable of allowing the user to perceive the stereoscopic effect of the video can be adopted.

Figure 2:
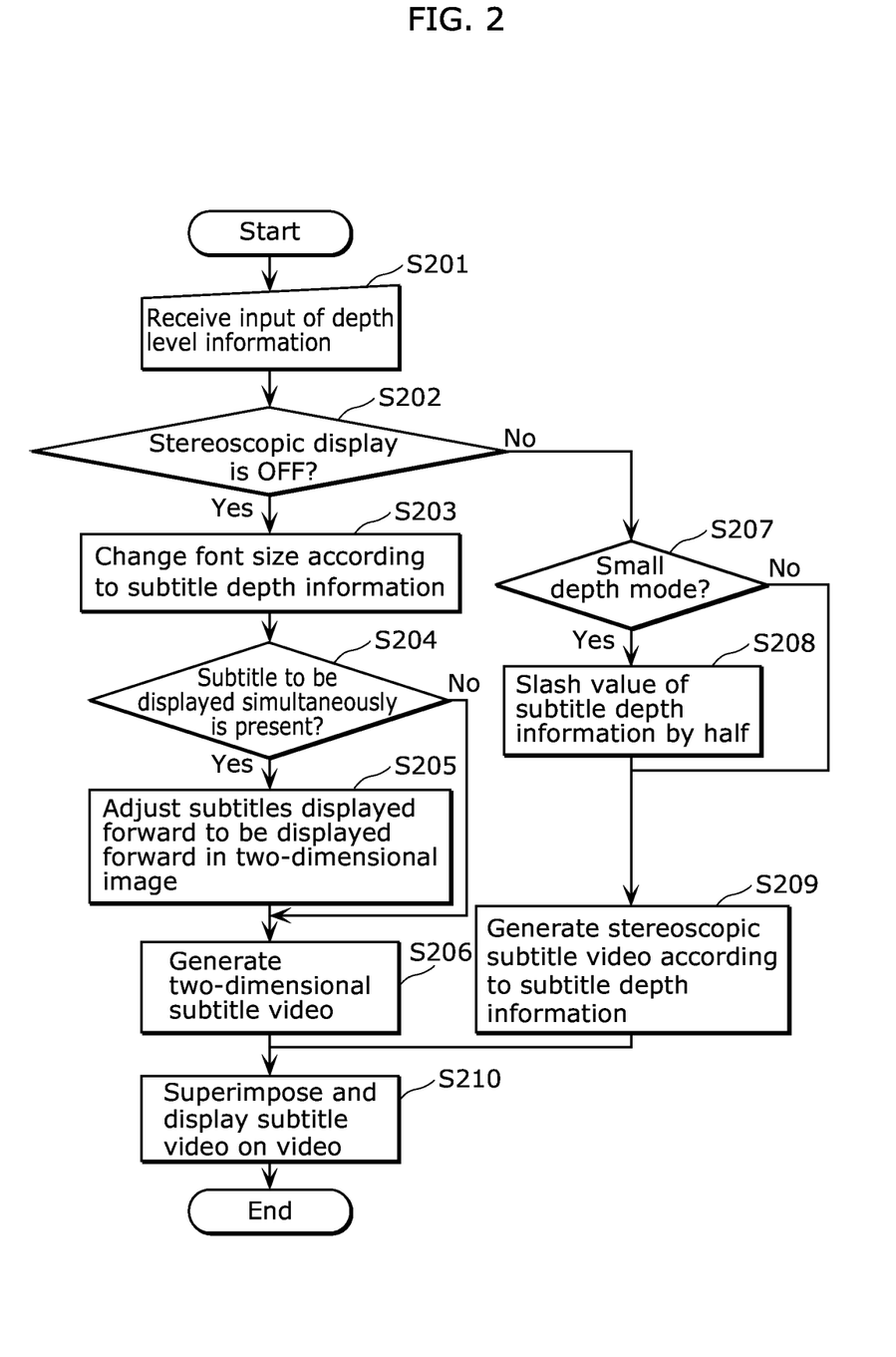
FIG. 2 is a flowchart of subtitle depth adjustment processing according to Embodiment 1.

Here, an operation performed by the subtitle depth adjustment unit 105 is described in detail with reference to the flowchart in FIG. 2. FIG. 2 is a flowchart of the subtitle depth adjustment processing according to Embodiment 1 of the present invention.

(S201) The depth level input unit 103 receives an input of depth level information designating the level of depth effect of the video. For example, the depth level information is designated by the user as the following three levels: "strong", "weak", and "OFF (apply two-dimensional display)".

(S202) The subtitle depth adjustment unit 105 then determines whether or not the depth level information inputted to the depth level input unit 103 indicates "OFF". Specifically, the subtitle depth adjustment unit 105 determines whether or not to perform stereoscopic display. The processing proceeds to S203 when it is determined not to perform stereoscopic display (depth level information: "OFF") in S202, and proceeds to S207 other than the above case.

(S203) The subtitle depth adjustment unit 105 then zeros the subtitle depth information (that is the parallax amount of the subtitle) obtained from the program receiving unit 101. With this, the subtitle displayed on the display unit 108 loses depth effect. Therefore, the subtitle depth adjustment unit 105 changes the font size of the subtitle data item to compensate for the lost depth effect.

Basically, the subtitle depth adjustment unit 105 decreases the font size of the subtitle which is to be located far (backward) and increases the font size of the subtitle which is to be located close (forward), based on the subtitle depth information (the value before being changed to zero) obtained from the program receiving unit 101. In other words, the subtitle depth adjustment unit 105 increases the font size of the subtitle data item which is to be moved backward and decreases the font size of the subtitle data item which is to be moved frontward, by setting the subtitle depth information to 0.

Instead of determining the fixed value of the font size to the subtitle depth information, the value may be set in a manner that an enlarged animation is displayed from a state of font size 0 until a final font size determined according to the subtitle depth information is reached, with a predetermined time.

Here, the video depth adjustment unit 104 converts the video obtained from the video reproduction unit 102 into a two-dimensional video, based on the depth level information (OFF) obtained from the depth level input unit 103. Specifically, the video depth adjustment unit 104 and the subtitle depth adjustment unit 105 adjust the depth effect of the video and the depth effect indicated in the subtitle depth information in association with each other.

How to convert the stereoscopic video into the two-dimensional video is not specifically limited. As an example, in the case where a video obtained from the video reproduction unit 102 includes the right-eye image and the left-eye image arranged alternately, the video depth adjustment unit 104 can generate the two-dimensional video by extracting one of the right-eye image and the left-eye image.

(S204) The subtitle depth adjustment unit 105 then determines whether or not there is any other subtitle data item to be displayed simultaneously. The processing proceeds to S205 when such data item is present, and proceeds to S206 other than the above case.

(S205) The subtitle depth adjustment unit 105 performs adjustment to overlay a subtitle data item to be displayed frontward, out of the subtitle data items displayed simultaneously, on other subtitle data items. For example, in rendering of a single two-dimensional image, subtitle data items may be rendered in sequence starting from a subtitle data item which is to be located the farthest to a subtitle data item which is to be located the closest.

(S206) The subtitle reproduction unit 106 obtains the subtitle depth information adjusted in S203 to S205 and the subtitle data items from the subtitle depth adjustment unit 105, and generates a two-dimensional subtitle video. The processing then proceeds to S210.

(S207) In contrast, when the stereoscopic display is not OFF in S202, the subtitle depth adjustment unit 105 determines whether the depth level information selected in S201 indicates "strong" or "weak". When "weak" is indicated, the processing proceeds to S208, and proceeds to S209 other than the above case.

(S208) The subtitle depth adjustment unit 105 slashes the value indicated in the subtitle depth information by half. With this, each of the subtitle instances is moved to be closer to the display screen, which weakens the depth effect. More specifically, a subtitle instance which is to be displayed forward from the display screen is moved backward. In contrast, a subtitle instance which is to be displayed backward from the display screen is moved forward. When a plurality of subtitle instances is present, the respective subtitle depth information is changed.

It is to be noted that the subtitle depth adjustment unit 105 may further adjust the subtitle depth information by recognizing the depth of the object captured in the video outputted from the video reproduction unit 102 and causing the subtitle to be displayed at an appropriate depth position based on the depth position of the object which appears in the X-Y coordinate region in which the subtitles are displayed.

Here, the video depth adjustment unit 104 slashes the depth effect of the video obtained from the video reproduction unit 102 by half, based on the depth level information (weak) obtained from the depth level input unit 103. Specifically, the video depth adjustment unit 104 and the subtitle depth adjustment unit 105 adjust the depth effect of the video and the depth effect indicated in the subtitle depth information in association with each other.

Furthermore, the subtitle depth adjustment unit 105 may change the font size of the subtitle as in S203, in response to the weakened depth effect of the subtitle. Here, since the depth relationship (anteroposterior relationship) becomes less as the depth effect is weaker, the amount of font size change may be increased as indicated in FIG. 3, as compensation.

Figure 3:
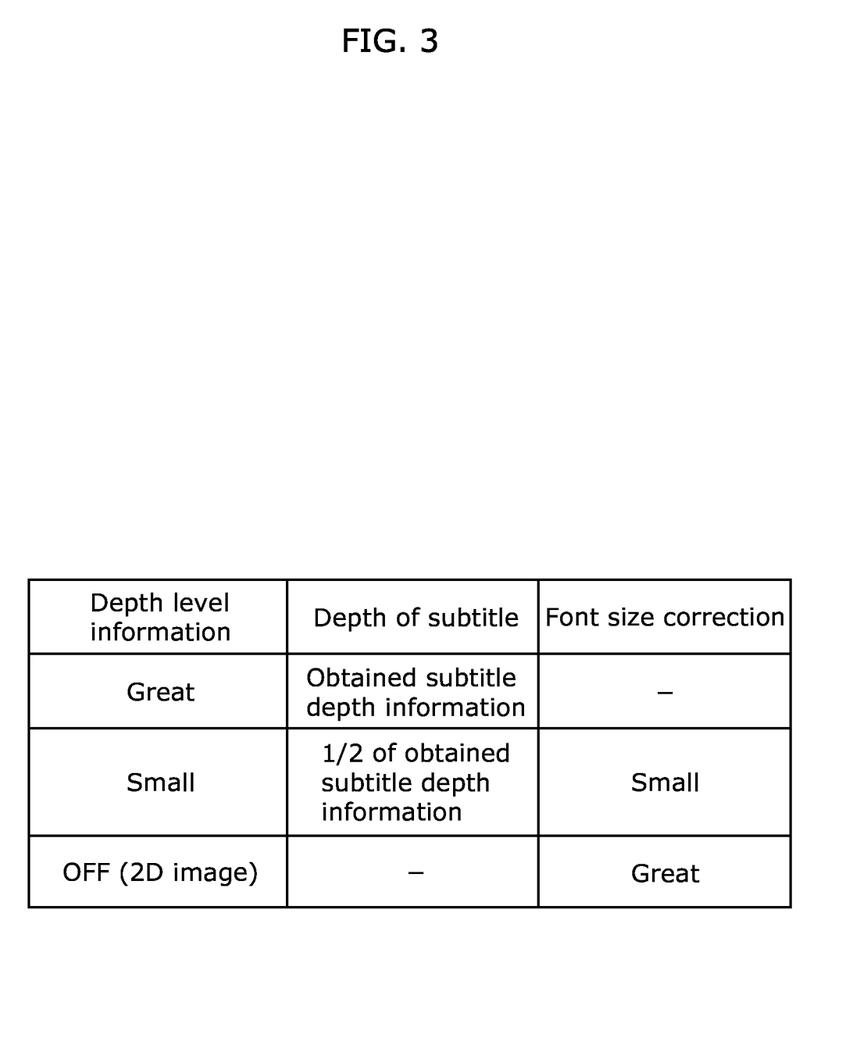
FIG. 3 is a table indicating a relationship between a degree of depth effect change and a degree of font size change.

FIG. 3 is a table indicating an example of the relationship between a degree of depth effect change and a degree of font size change. The left column in FIG. 3 represents a level of depth effect inputted in S201. The middle column represents a result of the subtitle depth information adjustment processing performed by the subtitle depth adjustment unit 105. The right column represents a result of the subtitle font size change processing performed by the subtitle depth adjustment unit 105.

As shown in FIG. 3, the degree of font size change when the depth level information indicates "OFF" may be set to be greater than the degree of font size change when the depth level information indicates "weak". With this, the difference in the font size between the subtitles when the depth level information indicates "OFF" is greater than when the depth level information indicates "weak". As a result, the lost depth effect can be compensated with the difference in font sizes.

(S209) Next, the subtitle reproduction unit 106 generates a stereoscopic subtitle video using the subtitle data item obtained from the subtitle depth adjustment unit 105 and the subtitle depth information.

(S210) The video combining unit 107 obtains the subtitle video generated in S206 or S209 from the subtitle reproduction unit 106, and displays the obtained subtitle video with superimposing onto the video obtained from the video depth adjustment unit 104.

Next, an example of the stereoscopic subtitle display is described.

Figure 4:
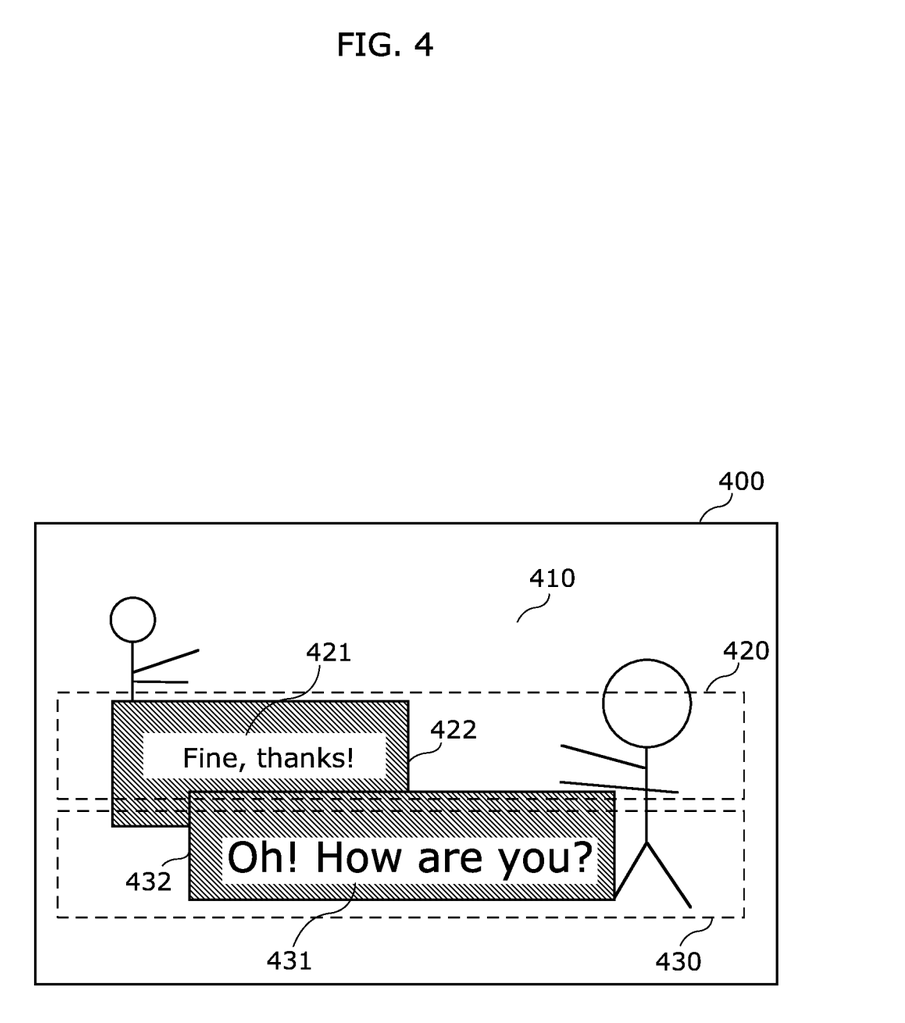
FIG. 4 illustrates an example of display of a combined video generated through the processing in FIG. 2.

FIG. 4 illustrates an example of a combined video (two-dimensional video) to be displayed on the display unit 108 when it is determined Yes in S202 in FIG. 2. The display image 900 is an image displayed on the display unit 108 at a certain moment, and includes a video 410, a first subtitle display area 420, and a second subtitle display area 430.

Assume that in FIG. 4, the subtitle depth information before being adjusted by the subtitle depth adjustment unit 105 indicates that the subtitle instance 421 is to be located farther from the subtitle instance 431. However, the case where it is determined "Yes" in S202 in FIG. 2 is a case where the combined video is displayed as a two-dimensional video. Specifically, the subtitle instances 421 and 431 look as if they were displayed on a single plane to the user viewing the displayed image 900.

Accordingly, the subtitle instance 421 which is originally to be displayed backward (that is moved forward by the subtitle depth adjustment unit 105) is displayed in a relatively small font size. In contrast, the subtitle instance 431 which is originally to be displayed forward (that is moved backward by the subtitle depth adjustment unit 105) is displayed in a relatively large font size.

As described above, when the stereoscopic video is displayed as the two-dimensional video, the video processing apparatus 100 having the above structure changes the depth effect of the subtitles in association with the depth effect of the video, and displays the depth effect of the subtitle set by the content producer by the difference in the font sizes. This allows reducing the burden placed on the user through the stereoscopic video viewing and showing the video in which the intention of the content producer is reflected appropriately. The same advantageous effect is expected to be produced in the case where the stereoscopic video is displayed with the depth effect weakened, without being limited to the case where the depth is completely lost (that is the two-dimensional video is shown).

Furthermore, the subtitle display area 432 in which the subtitle instance 431 is displayed may be enlarged with the increase in the font size of the subtitle instance 431. Alternatively, the subtitle display area 422 in which the subtitle instance 421 is displayed may be contracted with the decrease in the font size of the subtitle instance 421.

Here, the subtitle display areas 422 and 432 may be displayed translucently to prevent the video 410 from being completely hidden. The subtitle display area 422 which is originally to be located far is overlapped below the subtitle display area 432 which is originally to be located close, to realize display through which the perspective effect can be perceived from the positional relation even with the two-dimensional display device.

The perspective effect between the subtitles may be represented by clearly displaying the letters of the subtitle which is to be displayed closer by increasing the contrast, and by vaguely displaying the letters of the subtitle which is to be displayed farther. Alternatively, the subtitle to be displayed farther may be displayed with an increased transparency. Alternatively, the subtitle to be displayed closer may be displayed with a font with higher visibility. For example, the font in which the line constituting the letters is thick has a high visibility. Furthermore, the subtitles may be displayed in a limited display area and in a larger font by scrolling display. Alternatively, the letter to be read may be constantly enlarged and contracted as the time elapses, to utilize the nature of the human being of being sensitive to moving images.

(Embodiment 2)

Figure 5:
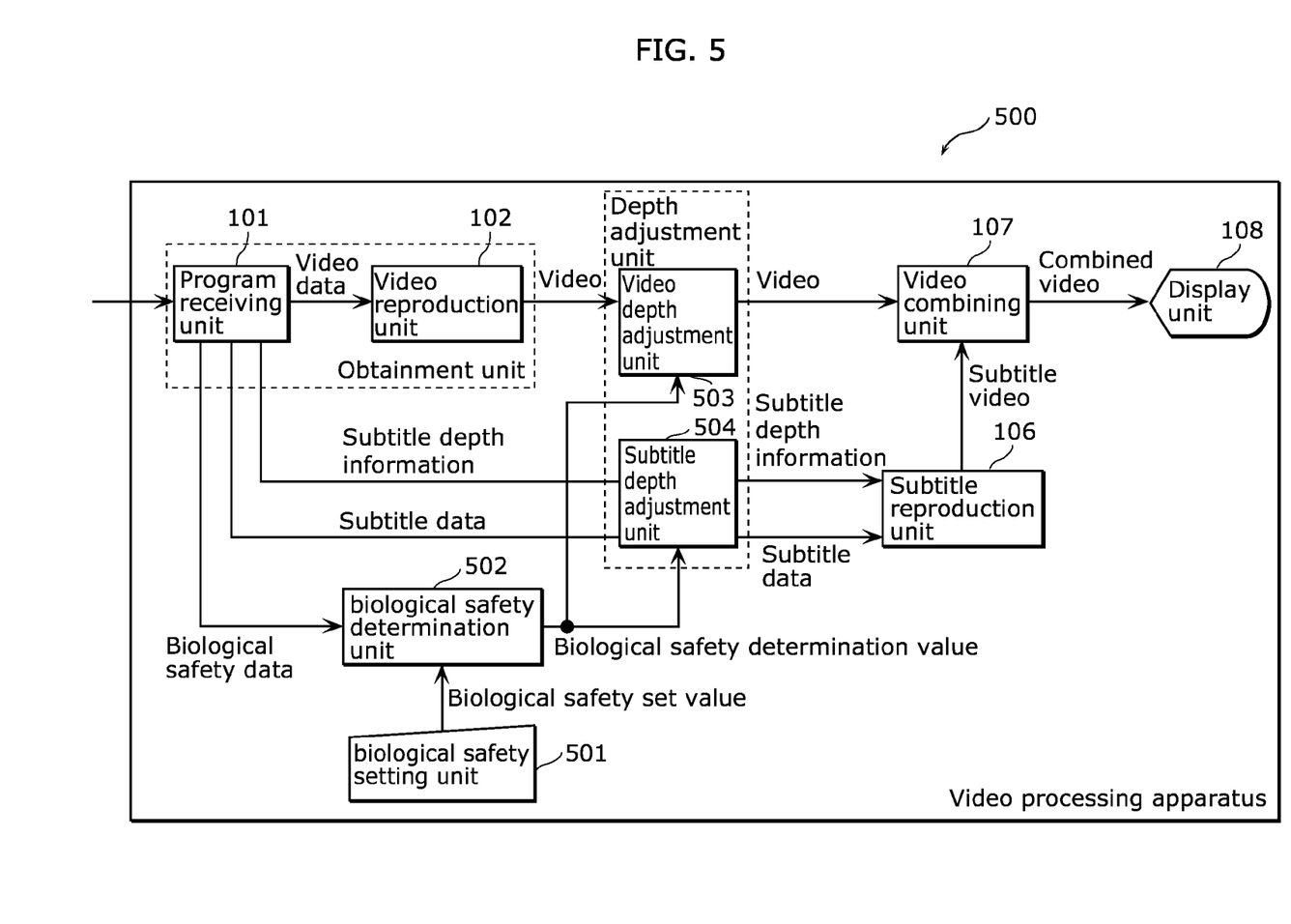
FIG. 5 is a diagram illustrating a structure of a video processing apparatus according to Embodiment 2.

FIG. 5 is a diagram illustrating a structure of a video processing apparatus 500 according to Embodiment 2 of the present invention. The description on commonalities with the Embodiment 1 is omitted in the description below to focus on differences.

The video processing apparatus 500 in FIG. 5 includes the program receiving unit 101, the video reproduction unit 102, a video depth adjustment unit 503, a subtitle depth adjustment unit 504, the subtitle reproduction unit 106, the video combining unit 107, the display unit 108, a biological safety setting unit 501, and a biological safety determination unit 502. It is to be noted that the constituent elements common to those in Embodiment 1 are assigned with the same numerical numbers and the description is omitted.

The biological safety setting unit 501 sets a degree of biological safety to be satisfied by the video processing apparatus 500 according to the user operation, and outputs the set value as a biological safety set value to the biological safety determination unit 502. It is to be noted that the biological safety set value is a value indicating a state (age, fatigue level, and a degree of influence (mainly adverse influence) by stereoscopic video viewing) of the user viewing the combined video displayed on the display unit 108, for example.

More specifically, the biological safety set value may be set by the user through the ON/OFF menu for designating whether or not the mode is a mode taking the biological safety into consideration, for example. Alternatively, the set value of the existing menu for parental lock setting may also be used. The parental lock is for restricting viewing of adult-themed programs including violent and sexual content. Alternatively, the set value may be changed according to the age of the individual viewer. The age of the individual may be recognized based on proximity of a person authentication chip, face recognition using a capturing device, and an attribute of the 3D glasses for use in stereoscopic viewing. Alternatively, a fatigue level indicating how fatigued the viewer's eyes are may be used. The fatigue level may be estimated from a time period in which the viewer has been viewing, focus, and speed following the video of viewpoint. The focus and speed following the video of viewpoint are obtained by scanning the retina.

The biological safety determination unit 502 obtains the biological safety data from the program receiving unit 101 and the biological safety set value from the biological safety setting unit 501, and calculates the biological safety determination value using at least one of the obtained biological safety data and the biological safety set value. The biological safety setting unit 501 then outputs the calculated biological safety determination value to the video depth adjustment unit 503 and the subtitle depth adjustment unit 504.

Examples of the biological safety set value include: "High" that is fairly safe and involves no problem, "Middle" that involves some risk, and "Low" that involves high risk. Alternatively, continuous values may be used.

The biological safety data is an index indicating how safe the program to be viewed itself is from the perspective of biological safety. For example, a news program, in which only one announcer is the speaker and entails few camera angle changes, is assigned with a value for safer program. In contrast, action movies, in which a plurality of speakers appear at the same time and entails drastic camera angle changes, is assigned with a value for more risky program. It is to be noted that a value directly designated by a content provider may be used as the biological safety data for each program, or a genre of a program (video data) may be converted into a value by the biological safety determination unit 502.

The video depth adjustment unit 503 is a counterpart of the video depth adjustment unit 104 in FIG. 1, and differs from the video depth adjustment unit 104 in that the depth effect of the video obtained from the video reproduction unit 102 is adjusted based on the biological safety determination value obtained from the biological safety determination unit 502. The subtitle depth adjustment unit 504 is a counterpart of the subtitle depth adjustment unit 105 in FIG. 1, and differs from the subtitle depth adjustment unit 105 in that the depth effect indicated in the subtitle depth information obtained from the program receiving unit 101 is adjusted based on the biological safety determination value obtained from the biological safety determination unit 502. It is to be noted that the depth effect is adjusted in the same manner as in Embodiment 1, and thus the explanation is omitted.

Figure 6:
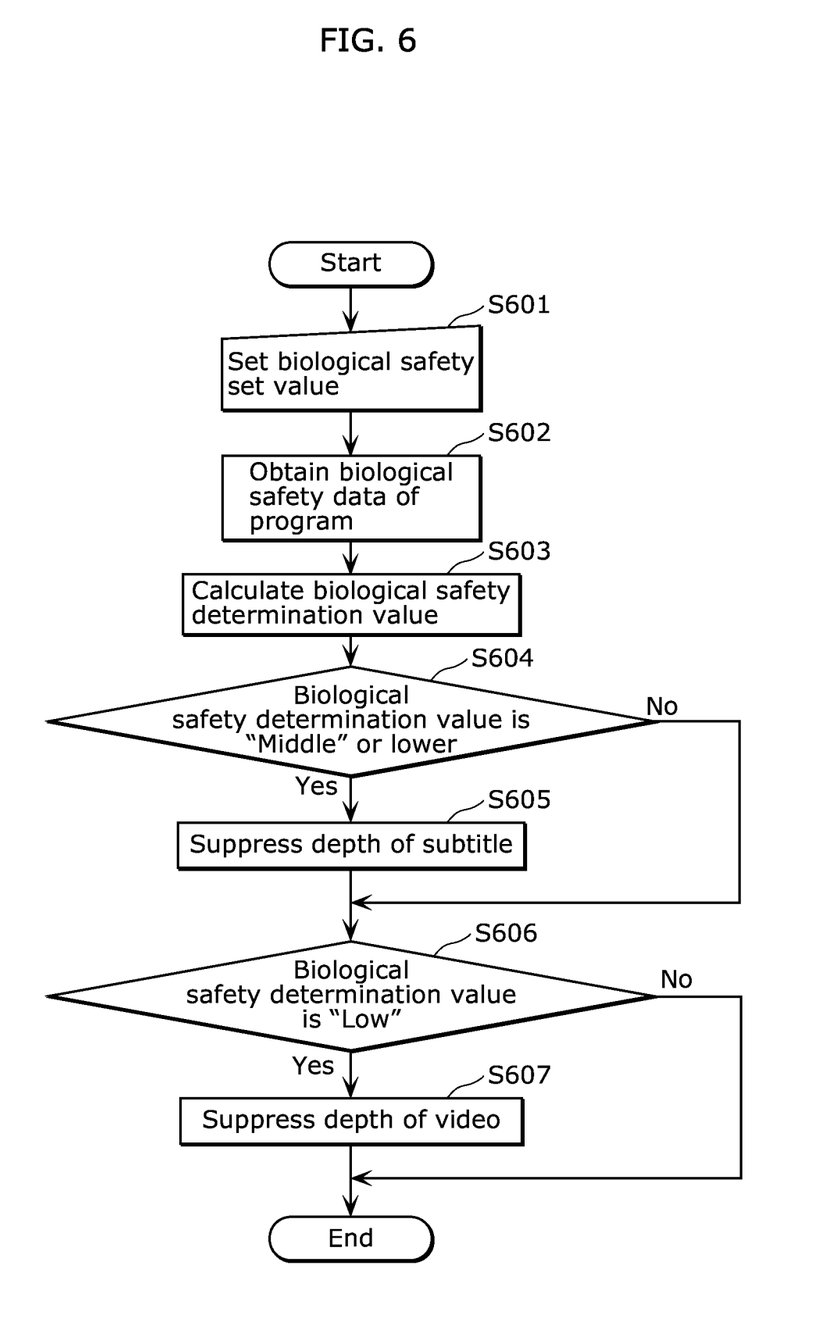
FIG. 6 is a flowchart of subtitle depth adjustment processing according to Embodiment 2.

FIG. 6 is a flowchart of the subtitle depth adjustment processing according to Embodiment 2 of the present invention.

(S601) First, the biological safety determination unit 502 obtains the biological safety set value from the biological safety setting unit 501. As described above, the biological safety set value may be a value set by the user, or the value detected by the biological safety setting unit 501.

(S602) The biological safety determination unit 502 then obtains the biological safety data of the program from the program receiving unit 101.

(S603) The biological safety determination unit 502 then calculates the biological safety determination value using the obtained biological safety set value and the biological safety data, and outputs the biological safety determination value to the video depth adjustment unit 503 and the subtitle depth adjustment unit 504. The biological safety determination value is set to a value indicating a higher degree of risk as the biological safety set value is set to a value indicating that the degree of risk is high and/or the biological safety data indicates a value that the degree of risk is high, for example.

The biological safety determination value is a value indicating the influence (risk) on the viewer when the viewer views the combined video displayed on the display unit 108, and takes any of "Low (risk level is high)", "Middle (risk level is middle)", and "High (risk level is low)", in this example.

It is to be noted that the biological safety determination value can also be generated from one of the biological safety set value and the biological safety data. When the biological safety determination value is calculated only from the biological safety set value, S602 may be skipped. In contrast, when the biological safety determination value is calculated only from the biological safety data, S601 may be skipped.

(S604) Next, the subtitle depth adjustment unit 504 compares the biological safety determination value obtained from the biological safety determination unit 502 with a predetermined first threshold ("Middle" in this example). When the biological safety determination value is "Middle" or higher (that is the risk level is higher than the first threshold), the processing proceeds to S605. Other then the above case, the processing proceeds to S606.

(S605) The subtitle depth adjustment unit 504 adjusts the subtitle depth information in a direction in which the depth effect of the subtitle data item is weakened. Here, the subtitle depth information may be adjusted in a manner that the subtitle data item becomes more flat as the risk level is higher. Specifically, when the biological safety determination value is "Low", the depth effect may be weakened further than when the biological safety determination value is "Middle". Furthermore, in the same manner as in Embodiment 1, the font size of the subtitle data item and how to overlay the subtitle data may be changed according to the weakened depth effect.

(S606) Next, the video depth adjustment unit 503 compares the biological safety determination value obtained from the biological safety determination unit 502 with a predetermined second threshold ("Low" in this example). When the biological safety determination value is "Low" or higher, the processing proceeds to S607. Other then the above case, the processing is completed. It is to be noted that the second threshold is higher than the first threshold (indicates higher risk level).

(S607) The video depth adjustment unit 503 suppresses the depth effect of the video. Here, in the same manner as in the case of the subtitle depth information, the depth effect may be weakened further (that is, changed to a more flat video) as the risk level indicated in the biological safety determination value is higher.

As described above, when the stereoscopic video viewing has some adverse influence on the user (that is, when the biological safety determination value is "Middle"), only the depth effect of the subtitle is suppressed (S605). In contrast, when the stereoscopic video viewing has a great adverse influence on the user (that is, when the biological safety determination value is "Low"), not only the depth effect of the subtitle but also the depth effect of the video is suppressed (S607). As described above, weakening the depth effect of the subtitles, from which the user cannot take his/her eyes off even for a moment, in priority to the video, allows effectively reducing the burden placed on the user.

Although the present invention is described based on the aforementioned embodiments, the present invention is obviously not limited to such embodiments. The following cases are also included in the present invention.

(Other Embodiment)

Although the present invention is described based on the aforementioned embodiments, the present invention is obviously not limited to such embodiments. The following cases are also included in the present invention.

Figure 7:
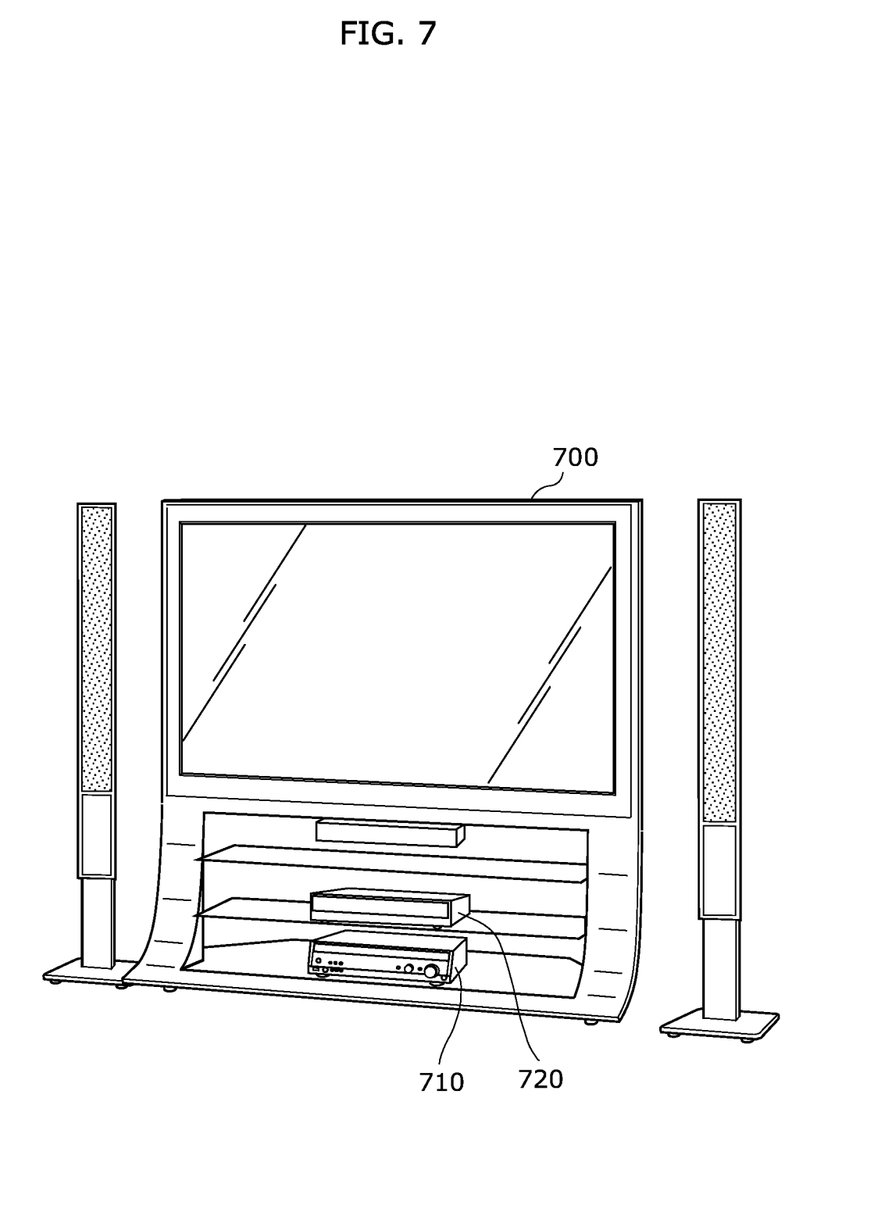
FIG. 7 illustrates an example of application of the video processing apparatuses according to Embodiments 1 and 2.

For example, the video processing apparatuses 100 and 500 according to the above respective embodiments may each be implemented as a TV 700 shown in FIG. 7. A specific structure of the display unit 108 here is not limited specifically, and liquid crystal displays, plasma displays, or organic electro luminescence (EL) displays may be adopted, for example.

Alternatively, the video processing apparatuses 100 and 500 can each be implemented as a digital versatile disc (DVD) player 710 shown in FIG. 7. In this case, the obtainment unit obtains the video data, subtitle depth information, subtitle data items, and so on from the DVD inserted. Furthermore, an output unit for outputting the combined video to an external display apparatus is provided instead of the display unit 108. It is to be noted that video data etc. may be obtained not only from the DVD but also from any recording medium such as Blu-ray disc, hard disk drive (HDD), and so on.

Moreover, the video processing apparatuses 100 and 500 may each be implemented as a set-top box 720 shown in FIG. 7. In this case, the obtainment unit obtains the video data etc. from a cable TV broadcast and so on. Furthermore, an output unit for outputting the combined video to an external display apparatus is provided instead of the display unit 108.

Each of the aforementioned apparatuses is, specifically, a computer system including a microprocessor, a ROM, a RAM, a hard disk unit, a display unit, a keyboard, a mouse, and so on. A computer program is stored in the RAM or hard disk unit. The respective apparatuses achieve their functions through the microprocessor's operation according to the computer program. Here, the computer program is configured by combining a plurality of instruction codes indicating instructions for the computer, in order to achieve predetermined functions.

A part or all of the constituent elements constituting the respective apparatuses may be configured from a single System-LSI (Large-Scale Integration). The System-LSI is a super-multi-function LSI manufactured by integrating constituent elements on one chip, and is specifically a computer system configured by including a microprocessor, a ROM, a RAM, and so forth. A computer program is stored in the RAM. The respective apparatuses achieve their functions through the microprocessor's operation according to the computer program.

A part or all of the constituent elements constituting the respective apparatuses may be configured as an IC card which can be attached and detached from the respective apparatuses or as a stand-alone module. The IC card or the module may be a computer system including the microprocessor, ROM, RAM, and the like. The IC card or the module may also be included in the aforementioned super-multi-function LSI. The IC card or the module achieves its function through the microprocessor's operation according to the computer program. The IC card or the module may be tamper resistant.

The present invention may be a method of the above. The present invention may be a computer program for realizing the previously illustrated method, using a computer, and may also be a digital signal including the computer program.

Furthermore, the present invention may be the computer program or the digital signal recorded in a computer-readable recording medium, for example, a flexible disk, a hard disk, a CD-ROM, an MO, a DVD, a DVD-ROM, a DVD-RAM, a Blu-ray Disc (BD), a semiconductor memory, or the like. Furthermore, the present invention also includes the digital signal recorded in these recording media.

Furthermore, the present invention may also be realized by transmission of the aforementioned computer program or digital signal via a telecommunication line, a wireless or wired communication line, a network represented by the Internet, a data broadcast, and so forth.

The present invention may also be a computer system including a microprocessor and a memory, in which the memory stores the aforementioned computer program and the microprocessor operates according to the computer program.

Furthermore, by transferring the program or the digital signal by recording onto the aforementioned recording media, or by transferring the program or digital signal via the aforementioned network and the like, execution using another independent computer system is also made possible.

Each of the above embodiment and modification examples may be combined.

Although the embodiment of the present invention has been described with reference to the drawings, the present invention is not determined by the embodiment illustrated. Various modifications or variation may be added to the above embodiment in the scope equal to the present invention or in the scope of equality.

INDUSTRIAL APPLICABILITY

With the video processing apparatus and the video processing method according to the present invention, the naturalness and reality is balanced, and the subtitles can be represented stereoscopically while closely reflecting the intention of the content producer not only with a 3D display device but also with a 2D display device. Thus, the present invention can be applied for a wider range of AV apparatuses and information apparatuses including two-dimensional display devices, in addition to AV apparatuses and information apparatuses capable of 3D displaying such as digital TVs.

REFERENCE SIGNS LIST

100, 500 Video processing apparatus
101, 801 Program receiving unit
102, 802 Video reproduction unit
103, 803 Depth level input unit
104, 503, 804 Video depth adjustment unit
105, 504 Subtitle depth adjustment unit
106, 806 Subtitle reproduction unit
107, 807 Video combining unit
108, 808 Display unit
400, 900 Display image
410, 910 Video
420, 920 First subtitle display area
421, 431, 921, 931 Subtitle instance
422, 432 Subtitle display area
430, 930 Second subtitle display area
501 Biological safety setting unit
502 Biological safety determination unit
700 TV
710 DVD player
720 Set-top box
800 Stereoscopic subtitle display apparatus

The invention claimed is:

1. A video processing apparatus comprising:
an obtainment unit configured to obtain a stereoscopic video, a subtitle data item, and subtitle depth information indicating a position of the subtitle data item in a depth direction;
a depth level input unit configured to receive an input of depth level information for adjusting a depth effect of the stereoscopic video;
a depth adjustment unit configured to adjust, according to the depth level information, the depth effect of the stereoscopic video and a depth effect of the subtitle data item indicated by the subtitle depth information in association with each other;
a subtitle video generation unit configured to generate a subtitle video from the subtitle depth information adjusted by the depth adjustment unit and the subtitle data item;

a video combining unit configured to combine the stereoscopic video and the subtitle video to generate a combined video;

an output unit configured to output the combined video generated by the video combining unit; and a biological safety determination unit configured to calculate a biological safety determination value indicating how much a viewer is influenced by viewing the combined video, wherein the depth adjustment unit is configured to weaken the depth effect of the subtitle data item indicated by the subtitle depth information when the biological safety determination value is greater than a first threshold.

2. The video processing apparatus according to claim 1, wherein the depth adjustment unit is configured to weaken the depth effect of the stereoscopic video when the biological safety determination value is greater than a second threshold that is greater than the first threshold.

3. The video processing apparatus according to claim 1, further comprising a biological safety setting unit configured to obtain a biological safety set value indicating a state of a user viewing the combined video outputted from the output unit, wherein the biological safety determination unit is configured to calculate the biological safety determination value based on the biological safety set value obtained by the biological safety setting unit.

4. The video processing apparatus according to claim 1, wherein the biological safety determination unit is configured to obtain information indicating a genre of the stereoscopic video from the obtainment unit and calculate the biological safety determination value based on the obtained information indicating the genre.

* * * * *